United States Patent
Teyeb et al.

(10) Patent No.: US 10,966,263 B2
(45) Date of Patent: Mar. 30, 2021

(54) METHODS AND OPERATIONS BY NETWORK NODES AND USER EQUIPMENTS

(71) Applicant: Telefonaktiebolaget LM Ericsson (publ), Stockholm (SE)

(72) Inventors: Oumer Teyeb, Solna (SE); Gunnar Mildh, Sollentuna (SE); Riikka Susitaival, Helsinki (FI); Stefan Wager, Espoo (FI); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 15/767,223

(22) PCT Filed: Feb. 8, 2018

(86) PCT No.: PCT/SE2018/050113
§ 371 (c)(1),
(2) Date: Apr. 10, 2018

(87) PCT Pub. No.: WO2018/203784
PCT Pub. Date: Nov. 8, 2018

(65) Prior Publication Data
US 2020/0267787 A1    Aug. 20, 2020

Related U.S. Application Data

(60) Provisional application No. 62/500,600, filed on May 3, 2017.

(51) Int. Cl.
*H04W 4/00* (2018.01)
*H04W 76/15* (2018.01)
(Continued)

(52) U.S. Cl.
CPC ....... *H04W 76/15* (2018.02); *H04W 36/0069* (2018.08); *H04W 76/19* (2018.02);
(Continued)

(58) Field of Classification Search
None
See application file for complete search history.

(56) References Cited

U.S. PATENT DOCUMENTS

2018/0376383 A1* 12/2018 Belghoul .............. H04W 36/28
2019/0045568 A1*  2/2019 Palat .................... H04W 76/27
(Continued)

FOREIGN PATENT DOCUMENTS

GB        2525891 A    11/2015
WO   WO 2011/120030 A1    9/2011
(Continued)

OTHER PUBLICATIONS

International Search Report and Written Opinion of the International Searching Authority, PCT/SE2018/050113, dated Feb. 22, 2019, 18 pages.
(Continued)

*Primary Examiner* — Clemence S Han
(74) *Attorney, Agent, or Firm* — Sage Patent Group

(57) ABSTRACT

A UE operating in a RAN may be configured to receive new radio, NR, radio resource control, RRC, messages from a secondary network node. The NR RRC messages may each contain a number that the secondary network node added to the NR RRC messages to indicate their respective order in a sequence which the NR RRC messages were sent by the secondary network node. The NR RRC messages may each contain parameters that the UE uses to configure its communications through a NR interface with the secondary network node. The UE may send NR RRC complete messages toward the secondary network node responsive to
(Continued)

receipt of the NR RRC messages, wherein the NR RRC complete messages each contain an indication of the NR RRC message that was received. The UE may control the sending of the NR RRC complete messages to indicate to the secondary network node whether the NR RRC messages are received in an order that is the same as the sequence.

21 Claims, 10 Drawing Sheets

(51) Int. Cl.
    *H04W 76/19*     (2018.01)
    *H04W 76/27*     (2018.01)
    *H04W 36/00*     (2009.01)
    *H04W 88/06*     (2009.01)
    *H04W 92/20*     (2009.01)

(52) U.S. Cl.
    CPC ........... *H04W 76/27* (2018.02); *H04W 88/06* (2013.01); *H04W 92/20* (2013.01)

(56) References Cited

U.S. PATENT DOCUMENTS

| | | | | |
|---|---|---|---|---|
| 2019/0159277 A1* | 5/2019 | Zhu | .................. | H04W 88/04 |
| 2019/0174466 A1* | 6/2019 | Zhang | .................. | H04L 5/005 |
| 2019/0199503 A1* | 6/2019 | Son | .................. | H04L 5/0094 |
| 2019/0387444 A1* | 12/2019 | Byun | .................. | H04W 76/20 |
| 2020/0077320 A1* | 3/2020 | Shimoda | .......... | H04W 36/0016 |
| 2020/0092748 A1* | 3/2020 | Teyeb | .................. | H04L 1/1848 |
| 2020/0120572 A1* | 4/2020 | Fiorani | .................. | H04W 36/38 |
| 2020/0196220 A1* | 6/2020 | Centonza | ............. | H04W 48/00 |
| 2020/0196374 A1* | 6/2020 | Lim | .................. | H04W 76/27 |
| 2020/0205123 A1* | 6/2020 | Byun | .................. | H04W 76/27 |
| 2020/0396663 A1* | 12/2020 | Byun | .................. | H04W 36/023 |

FOREIGN PATENT DOCUMENTS

WO    WO 2014/206445 A1    12/2014
WO    WO 2015/065080 A1    5/2015

OTHER PUBLICATIONS

Intel Corporation et al., Discussion on NR SgNB RRC message transfer directly to the UE, 3GPP TSG-RAN WG2 Meeting #97, Athens, Greece, Feb. 13-17, 2017, R2-1701718, XP51212291A.

NEC, Direct RRC signaling on SCG in LTE-NR Dual Connectivity, 3GPP TSG-RAN WG2 #97, Athens, Greece, Feb. 13-17, 2017, R2-1701947, XP51212473A.

3GPP TS 36.300 V14.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 330 pages, Mar. 2017.

3GPP TR 38.801 V2.0.0, "3rd Generation Partnership Project; Technical Specification Group Radio Access Network; Study on New Radio Access Technology; Radio Access Architecture and Interfaces (Release 14)," 90 pages, Mar. 2017.

Notification of Transmittal of the International Search Report and the Written Opinion of the International Searching Authority, or the Declaration for PCT International Application No. PCT/SE2018/050113 dated May 4, 2018.

Nokia et al., "Measurement coordination for LTE-NR tight interworking," 3GPP TSG-RAN WG2 Meeting #97bis, R2-1702693, 5 pages, Spokane, USA, Apr. 3-7, 2017.

Ericsson, "SCG SRB configuration and use in LTE-NR internetworking," 3GPP TSG-RAN WG2 Meeting #97bis, R2-1702705, 5 pAGES, Spokane, USA, Apr. 3-7, 2017.

Catt, "Consideration on dual RRC for LTE and NR internetworking," 3GPP TSG-RAN WG2 Meeting #97bis, R2-1703093, 3 pages, Spokane, USA, Apr. 3-7, 2017.

Intel Corporation, "NR SCG SRB handling in UE," 3GPP TSG-RAN WG2 Meeting #97bis, R2-1703430, 3 pages, Spokane, USA, Apr. 3-7, 2017.

* cited by examiner

METHODS AND OPERATIONS BY NETWORK NODES AND USER EQUIPMENTS

CROSS REFERENCE TO RELATED APPLICATION

This application is a 35 U.S.C. § 371 national stage application of PCT International Application No. PCT/SE2018/050113, filed on Feb. 8, 2018, which itself claims priority to U.S. Provisional Application No. 62/500,600 filed May 3, 2017, the disclosure and content of both of which are incorporated herein by reference in their entireties.

TECHNICAL FIELD

The present disclosure relates to methods and operations by network nodes and user equipments in a radio communications system for sending radio resource control messages.

BACKGROUND

In LTE, the Radio Resource Control (RRC) protocol is used to configure/setup and maintain the radio connection between the user equipment (UE) and the enhanced NodeB (eNB). When the UE receives an RRC message from the eNB, it will apply the configuration (where the term "compile" refers to the application of the configuration to control communications), and if this succeeds the UE generates a RRC complete message that indicates the transaction ID of the message that triggered this response.

E-UTRAN supports Dual Connectivity (DC) operation whereby a multiple Rx/Tx UE in RRC_CONNECTED is configured to utilize radio resources provided by two distinct schedulers, located in two eNBs (radio base stations) connected via a non-ideal backhaul over the X2 interface (see 3GPP 36.300). "Non-ideal backhaul" implies that the transport of messages over the X2 interface between the nodes may be subject to both packet delays and losses.

eNBs involved in DC for a certain UE may assume two different roles: an eNB may either act as an MN (Master node), also referred to as Master eNB (MeNB) or as an SN (Secondary node), also referred to as Secondary eNB (SeNB). In DC a UE is connected to one MN and one SN.

In LTE DC, the radio protocol architecture that a particular bearer uses depends on how the bearer is setup. Three bearer types exist: MCG (Master Cell Group) bearer, SCG (Secondary Cell Group) bearer, and split bearers. RRC is located in the MN and SRBs (Signaling Radio Bearers) are always configured as MCG bearer type and therefore only use the radio resources of the MN. When a node acts as an SN, the LTE DC solution does not have any UE RRC context of that UE and all such signaling is handled by the MN.

FIG. 1 is a block diagram of a LTE system having a MN node 100 and a SN node 110, and illustrates the related DC User Plane (UP). The MN and SN nodes 100,110 include Packet Data Convergence Protocol (PDCP) modules 102, Radio Link Control (RLC) modules 104, and Media Access Control (MAC) modules 106. The PDCP module 102 of the MN node 100 handles the split bearer and communicates with a RLC module of the SN node 110.

FIGS. 2 to 4 show the UP and Control Plane (CP) architectures for LTE-New Radio (NR) tight interworking. In particular, FIG. 2 shows a MN node 200 and a SN node 210 configured for LTE-NR tight interworking, and illustrates the User Plane (UP). FIG. 3 shows a MN node 300 and a SN node 310 configured for split bearer for Control Plane in 5G. FIG. 4 shows a control plane architecture for LTE-NR tight interworking, and illustrates control flow between the modules.

The MN and SN nodes disclosed herein can apply various radio interface technologies. The MN node can apply e.g. LTE or New Radio interface (NR), and the SN node can also use either LTE or NR. Other technologies could also be used over the radio interface. The 3GPP technical report TR 38.304 includes various scenarios and combinations where the MN and SN are applying either NR, LTE or both.

For the first phase of 5G standardization and 5G deployment, the most likely scenario is that MN will apply LTE, and the SN will apply the New Radio interface currently being under standardization. The terms master eNB (MeNB) and Secondary NG Base Station (SgNB) are therefore used, without limitation, to refer to network nodes herein.

As already mentioned above, the DC approach introduced for 5G standardization includes a solution for split bearers for signaling radio bearers (SRBs), see FIGS. 3 and 4. The intent of introducing such "RRC diversity" is to enable, e.g., improved mobility robustness and improved message delivery between the infrastructure and the UE. For example, it is then possible to send a handover message or any other reconfiguration message over the best link, even if one of either the link or links to the MeNB (or SgNB) has deteriorated significantly. It is also possible to send duplicates of the same message over both MeNB and SgNB to achieve a better success-rate and faster delivery of the concerned message; in case the links are error prone. Such benefits of "RRC diversity" is not available in the current LTE DC solution, and 3GPP has therefore undertaken the challenge to enable such RRC diversity. Having RRC diversity may prove particularly important for ultra-reliable connections with low latency, often called URLLC (Ultra Reliable Low Latency Communication).

As can be seen in FIG. 4, RRC messages generated/transmitted from the master node (MN) 400 can be sent either via the MeNB, or relayed over an X2 interface to the SgNB 410. The messages received over the different paths in the UE 420 are then combined by the LTE PDCP and then forwarded to the LTE RRC receiving entity and processed further. In the uplink, the UE 420 generates LTE RRC messages that it may transmit either over the NR radio interface towards the SgNB 410 or via the MeNB node 400 using LTE technology. Messages received in the SgNB 410 are then forwarded over an X2 interface towards the MeNB node 400.

Another control signaling mechanism (in addition to direct SRB and split SRBs) in LTE-NR tight interworking is using embedded RRC also illustrated in FIG. 4. Embedded RRC is employed for two cases:

1. When direct SRB is not available and the SgNB has to configure the UE that affects only the NR leg.
2. The UE has to be configured with settings that affect both the NR and LTE legs (i.e. co-ordination is required), even if direct SRB is available.

For the first case, the SgNB sends the RRC message to the MeNB via the X2 interface, which the MeNB then embeds in its own RRC message and sends via SRB1 (which could be split or not). The UE will then be able to extract the embedded NR RRC message from the container MeNB RRC message and apply the configurations on the NR leg for communications with the SgNB. In the UL direction, the UE embeds the NR RRC messages in an LTE RRC message towards the MeNB, and the MeNB will extract the embedded NR RRC message from this and forwards it to the SgNB via the X2 interface.

For the second case, i.e. messages/configurations that require coordination between the MeNB and SgNB (e.g. inter-RAT measurement configurations, settings affecting buffer sizes which the UE has to allocate to the NR and LTE legs without exceeding the total buffering capability of the UE, etc.), the SgNB node can send the NR configurations, the MeNB and SgNB can negotiate the final configurations (as it affects the settings of both legs), and the MeNB sends the final configuration to the UE via an LTE RRC message.

Due to this possibility of sending RRC messages between the SgNB and UE via the two different paths, i.e. one path being an NR RRC message embedded in an LTE RRC message and sent via the MeNB and another path being an NR RRC message that is sent directly from/to the SgNB via direct SRB, a race condition problem could arise due to the out of order reception of messages sent via these two paths.

SUMMARY

According to some embodiments of inventive concepts, a user equipment (UE) that operates in a radio access network (RAN) may be configured to receive new radio (NR) radio resource control (RRC) messages from a secondary network node. The NR RRC messages may each contain a number that the secondary network node added to the NR RRC messages to indicate their respective order in a sequence which the NR RRC messages were sent by the secondary network node. The NR RRC messages may each contain parameters that the UE uses to configure its communications through a NR interface with the secondary network node. Some of the NR RRC messages may be received through direct signaling radio bearer (SRB) communications from the secondary network node and some other of the NR RRC messages are routed by the secondary network node through a master network node and received by the UE from the master network node using embedded RRC. The user equipment may send NR RRC complete messages toward the secondary network node responsive to receipt of the NR RRC messages, wherein the NR RRC complete messages each contain an indication of the NR RRC message that was received. The user equipment may control the sending of the NR RRC complete messages to indicate to the secondary network node whether the NR RRC messages are received in an order that is the same as the sequence.

According to some other embodiments of inventive concepts, a secondary network node may perform control signaling to a user equipment (UE) that operates in a radio access network (RAN). The secondary network node may send a sequence of new radio (NR) radio resource control (RRC) messages toward the UE. The NR RRC messages may each contain parameters that configure a UE's communications through a NR interface. Some of the NR RRC messages in the sequence are sent through direct signaling radio bearer (SRB) communications to the UE and some other of the NR RRC messages in the sequence are routed through a master network node for sending by embedded RRC to the UE. The secondary network node may control the sending of the NR RRC messages in the sequence to avoid the UE receiving the NR RRC messages in an order that is different from the sequence.

Further embodiments of inventive concepts provide e.g. corresponding user equipments, network nodes and computer program products, According to some embodiments of the inventive concepts, race conditions between embedded RRC and direct SRB in messaging between the secondary network node and the UE are prevented or mitigated. Preventing such race conditions can ensure that the UE and network configurations assumed by the network node are correctly synchronized, and which can avoid otherwise unexpected UE/network behavior/performance.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Figure 1:
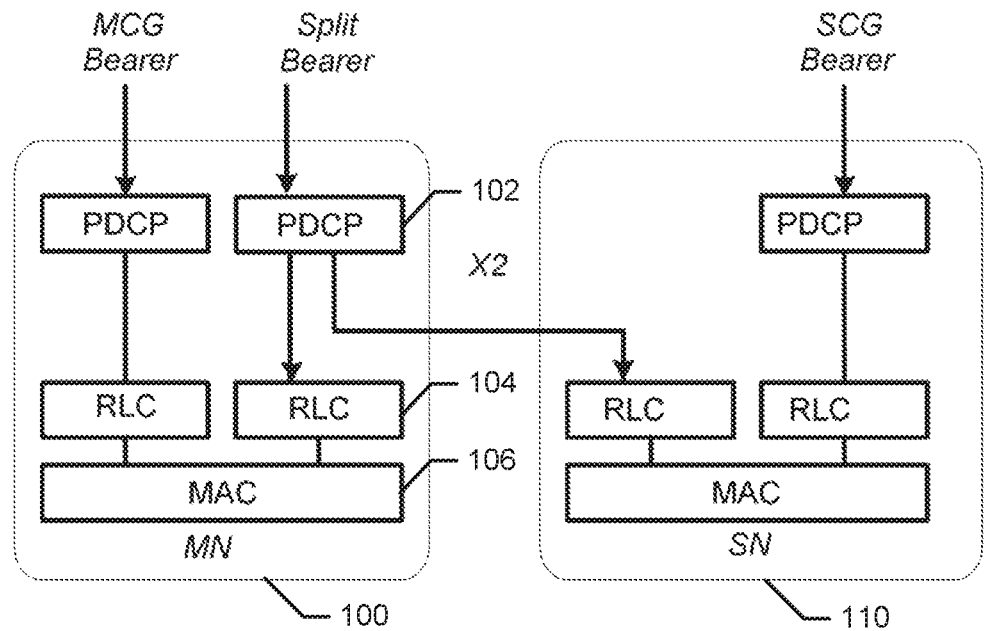
FIG. 1 is a block diagram of a LTE system having a MN node and a SN node and illustrates a DC User Plane.
Figure 2:
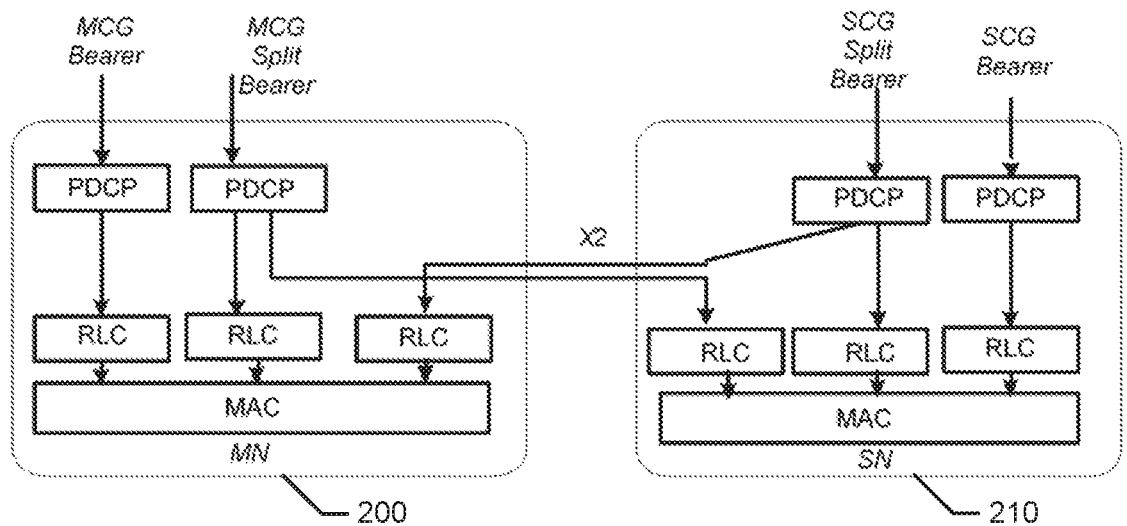
FIG. 2 is a block diagram illustrating a MN node and a SN node configured for LTE-NR interworking.
Figure 3:
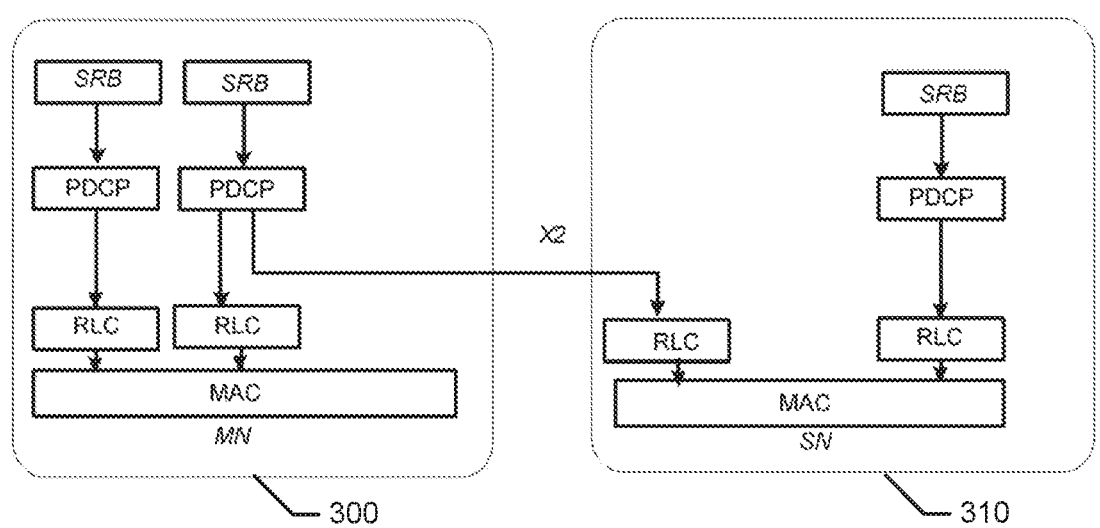
FIG. 3 is a block diagram illustrating a MN node and a SN node configured for split bearer for Control Plan in 5G.
Figure 4:
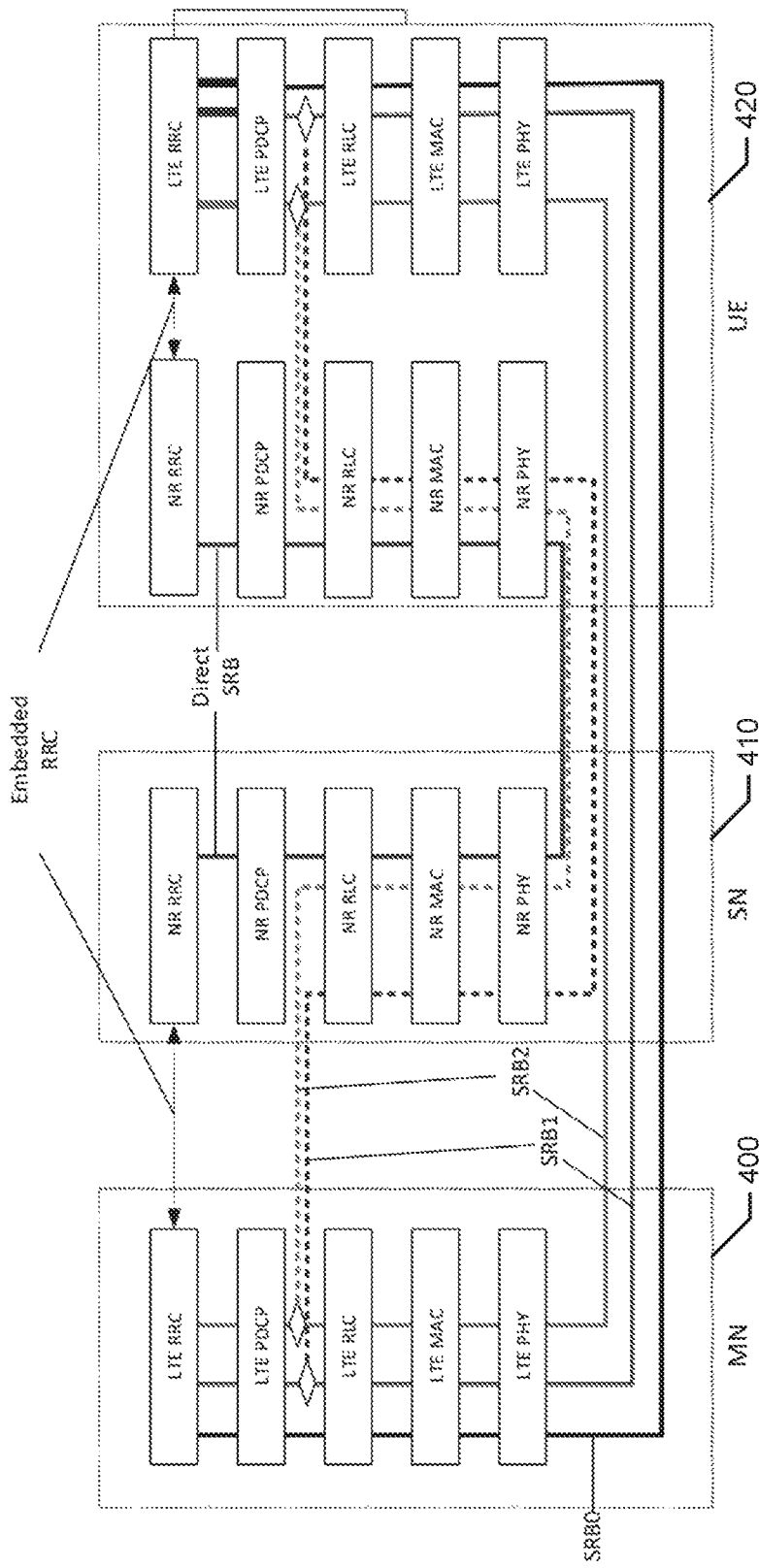
FIG. 4 is a block diagram of an exemplary control plane architecture for LTE-NR tight interworking illustrating control flow between nodes.
Figure 5:
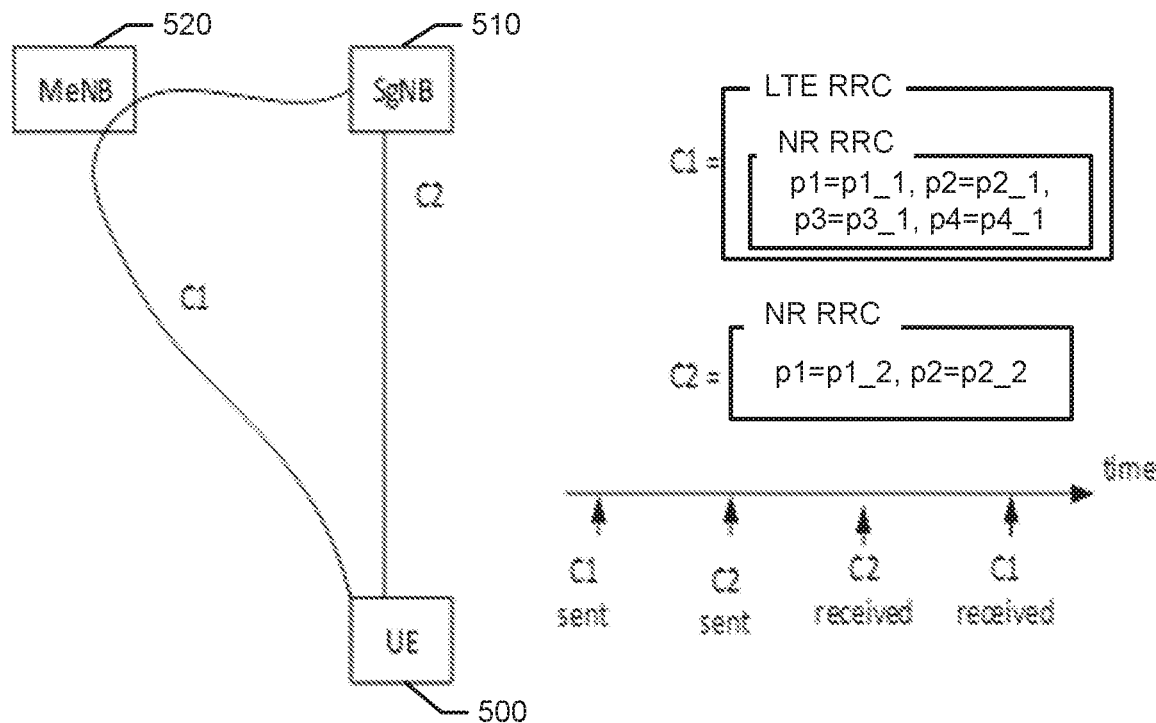
FIG. 5 is a block diagram illustrating a race condition that occurs between an embedded RRC message and a direct SRB message sent between a SgNB and a UE via two different paths.

As explained above, it is possible that a race condition problem can arise due to the out of order reception of NR RRC messages sent between the SgNB and UE via the two different paths (direct SRB message or indirect embedded RRC message via the MeNB). FIG. 5 is a block diagram of a system showing a race condition that occurs between an embedded RRC message and direct SRB message sent between a SgNB 510 and a UE 500 via the two different paths, where one path is direct and the other path is indirect through a MeNB 520.

Message C1 was sent via embedded RRC (for example, because parameters p3 and p4 require co-ordination between MeNB 520 and SgNB 510), and after a time delay, message C2 was sent via direct SRB (for example, because parameters p1 and p2 do not require co-ordination between the MeNB 520 and SgNB 510). For the scenario illustrated in FIG. 5, C2 arrives before C1, and according to the agreements in RAN2 #97bis (i.e. direct SRB messages are processed one at a time and there is no reordering between the direct SRB and embedded RRC). C2 will be therefore be acted upon and the parameters p1 and p2 will be set to p1_2 and p2_2, respectively. Message C1 is received later and thereafter, parameters p1 and p2 will be set to p1_1 and p2_1, respectively. That is, at that point in time, the SgNB will erroneously assume the UE is using the values of p1_2 and p2_2, when the UE is actually using the old values p1_1 and p2_1. This condition will lead to unexpected UE/network behavior because the UE will be using a different configuration than what the SgNB 510 is assuming the UE's 500 configuration to be.

Various embodiments of the present disclosure are directed to preventing or mitigating race conditions between embedded RRC and direct SRB in messaging between the SgNB 510 and the UE 500. Preventing such race conditions can ensure that the UE 500 and network configurations assumed by the SgNB 500 are correctly synchronized, and which can avoid otherwise unexpected UE/network behavior/performance.

Some embodiments of the present disclosure are directed to operational mechanisms by the network that prevent race conditions from occurring between embedded RRC and direct SRB. This is done by ensuring that conflicting information doesn't reach the UE 500 and that the UE 500 can process the RRC messages it receives one by one on arrival, regardless of whether the messages were received via embedded RRC or direct SRB.

Operational mechanisms at the UE 500 are also proposed that mitigate a race condition that has already occurred in case the preventive measures were not taken on the network side. This may be achieved by the UE 500 merging current and previous configurations, which can include the UE 500 operating to check which configuration parts are conflicting and selecting the latest part for use. Additional UE mechanisms are also disclosed that can be applied on top of the network mechanisms for efficient operations, which can include preventing unnecessary retransmission of RRC messages for race condition resolution.

Within the context of the present disclosure, the terms 5G and NR are used interchangeably, and it will be apparent from the context of the description if the term refers specifically to the NR radio interface, or if the term refers to the broader 5G architectural concepts described within this disclosure. The embodiments that are disclosed herein are not only limited to a solution that operate with the NR or LTE technologies. Instead, these embodiments are more generally applicable to any radio solution that requires a solution for detecting, managing and recovering from race conditions occurring because of having two separate paths for sending RRC or in general control signaling between a network node and a UE.

The interface between the MeNB and SgNB are referred to herein as X2, based on the current interface definitions in LTE. For LTE-NR interworking and NR-NR interworking cases, the exact name for such an interface may be different (e.g. Xn instead of X2, with the corresponding XnAP protocol instead of X2AP). However, such interface terms do not affect the operation of the embodiments disclosed herein.

The term SN used below refers to Sequence Number and the term SgNB refers to Secondary Node to avoid confusion.

In some embodiments, the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

Network Operational Mechanisms

Figure 6:
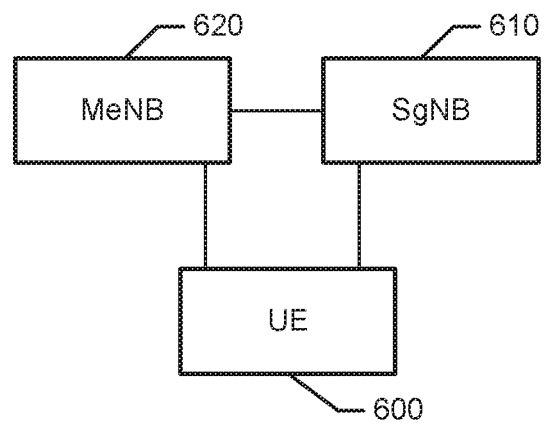
FIG. 6 is a block diagram of a communication system that includes a UE that operates to communicate with an MeNB and a SgNB according to some embodiments.

Operational mechanisms are disclosed in this section that can be carried out by the network to prevent race conditions from occurring between embedded RRC and direct SRB. Corresponding UE operational mechanisms to recover from a race condition that has already happened are described in the next section. These embodiments are explained in the context of FIG. 6, which is a block diagram of a communication system. The communication system includes a UE 600 that communicates with a SgNB 610 and a MeNB 620.

Figure 7:
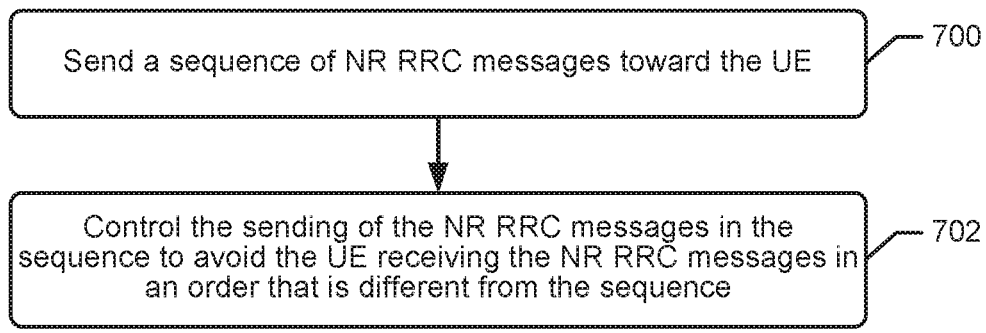
FIGS. 7-12 are flow charts of operations of a secondary network node to prevent race conditions for occurring between embedded RRC and direct SRB according to some embodiments.

Some embodiments of this disclosure are directed to operations and methods by a secondary network node to perform control signaling to a UE that operates in a RAN. FIG. 7 illustrates the operations and methods according to some embodiments. A sequence of NR RRC messages are sent (700) toward the UE 600. The NR RRC messages each contain parameters that configure the UE's 600 communications through a NR interface. Some of the NR RRC messages in the sequence are sent through direct SRB communications to the UE 600 and some other of the NR RRC messages in the sequence are routed through a master network node for sending by embedded RRC to the UE 600. The sending of the NR RRC messages in the sequence is controlled (702) to avoid the UE 600 receiving the NR RRC messages in an order that is different from the sequence.

In a first embodiment of this disclosure, the SgNB 610 waits for a corresponding complete message before initiating the next NR RRC message, irrespective of whether the next message (or the previous message) is to be sent via direct SRB or embedded RRC. However, in some cases, it might not be desirable to wait for a reception of a complete message before initiating the next RRC message, e.g. such as when an urgent configuration for inter-frequency measurement on the SgNB leg is required due to a reception of a measurement report before a complete message was received from the UE.

Figure 8:
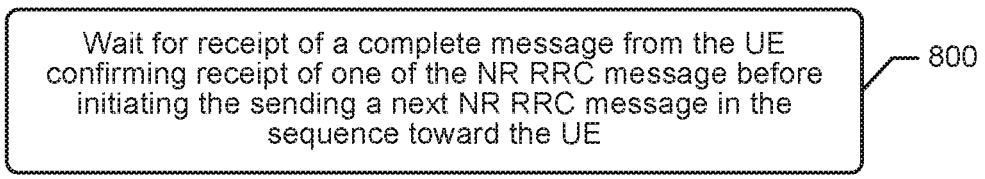

FIG. 8 illustrates related operations and methods according to the first embodiment. Referring to FIG. 8, the controlling of the sending of the NR RRC messages in the sequence, includes waiting (800) for receipt of a complete message from the UE confirming receipt of one of the NR RRC message before initiating the sending a next NR RRC message in the sequence toward the UE.

In a second embodiment of this disclosure, various possible shortcomings that may arise with operations according to the first embodiment may be avoided by ensuring that only parameters that require co-ordination between the MeNB and SgNB are configured via embedded RRC, while parameters that do not require co-ordination are only sent via direct SRB. The second embodiment eliminates the need to wait for a complete message before sending the next message. But on the other hand, it may be inefficient because it may be necessary to send two RRC messages instead of one for configuring parameters that need co-ordination and for those that don't. For example, with reference to the operations described for FIG. 5, when a message has to be split into one embedded RRC message C1 (which includes the configuration of parameters p3 and p4 that require co-ordination between the MeNB and SgNB) and another direct SRB message C2 (which includes the configuration of parameters p1 and p2 that do not require co-ordination).

Figure 9:
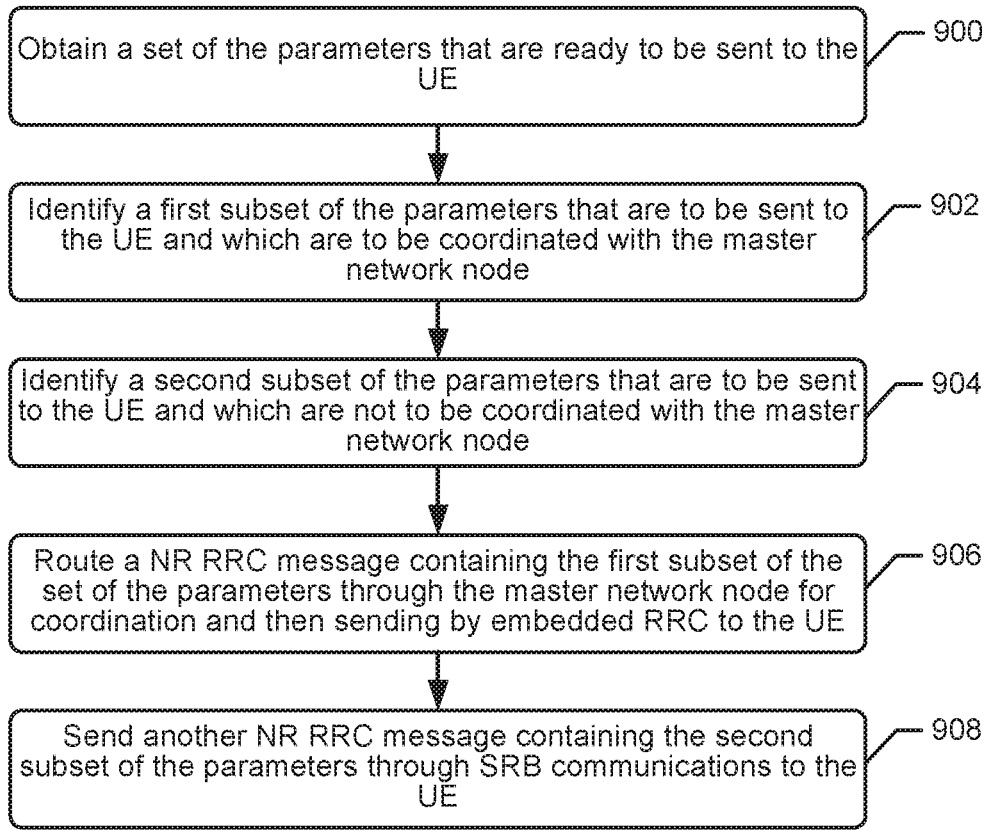

FIG. 9 illustrates related operations and methods according to the second embodiment. Referring to FIG. 9, the controlling of the sending of the NR RRC messages in the sequence, includes obtaining (900) a set of the parameters that are ready to be sent to the UE, identifying (902) a first subset of the parameters that are to be sent to the UE and which are to be coordinated with the master network node, and identifying (904) a second subset of the parameters that are to be sent to the UE and which are not to be coordinated with the master network node. The controlling of the sending of the NR RRC messages in the sequence, further includes routing (906) a NR RRC message containing the first subset of the set of the parameters through the master network node for coordination and then sending by embedded RRC to the UE, and sending (908) another NR RRC message containing the second subset of the parameters through SRB communications to the UE.

In a third embodiment of this disclosure, the SgNB 610 maintains a record of a sequence of sent RRC messages, both the ones sent via direct SRB and embedded RRC, and removes a sent RRC message from the record only when it is determined that the RRC complete message was received by the UE 600 and only if the compete RRC message was received in the sequence order with which it was sent. If the SgNB 610 determines that there was re-ordering of two sequentially sent messages, it can respond by restoring the newest values by resending the overwritten configuration to the UE. For example, for the case described for FIG. 5, when the SgNB 610 notices that the complete message for the C2 is received followed by the complete message corresponding to C1, the SgNB 610 can responsively resend the C2 message to ensure that the new configuration values will be used by the UE 600 (or alternatively the SgNB 610 can make note of the overwritten configuration and update the UE's RRC context that the SgNB 510 internally maintains for use in communicating with the UE 600).

Figure 10:
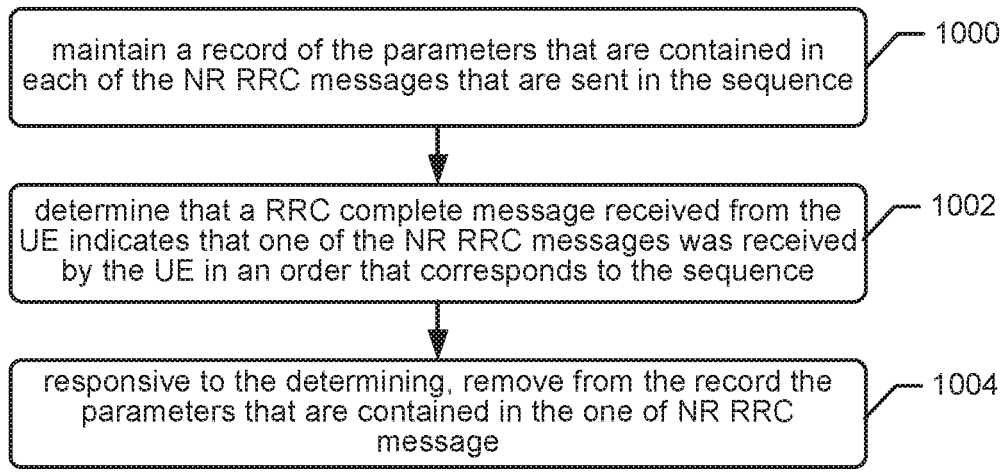

FIG. 10 illustrates related operations and methods according to the third embodiment. Referring to FIG. 10, the controlling of the sending of the NR RRC messages in the sequence, includes maintaining (1000) a record of the parameters that are contained in each of the NR RRC messages that are sent in the sequence, determining (1002) that a RRC complete message received from the UE indicates that one of the NR RRC messages was received by the UE in an order that corresponds to the sequence. Responsive to the determining, the parameters that are contained in the one of NR RRC message are removed (1004) from the record.

The step of controlling (702) may include further determining that another RRC complete message received from the UE indicates that another one of the NR RRC messages was received by the UE in an order that does not correspond to the sequence. Responsive to the further determining, the parameters contained in the another one of the NR RRC messages and sending a further NR RRC message containing the retrieved parameters toward the UE can be retrieved from the record.

The step of controlling (702) may alternatively or additionally include further determining that another RRC complete message received from the UE indicates that another one of the NR RRC messages was received by the UE in an order that does not correspond to the sequence. Responsive to the further determining, the parameters in the record can be used to identify identifying which parameters the UE is presently using to configure communications through the NR interface, and using the identified parameters for communications with the UE through the NR interface.

A potential drawback of the third embodiment is that the SgNB 610 may need to resend messages that are received out of order. Also, the message retransmission might have been in vain if the out of order reception of the complete messages was not because the original RRC messages were received out of order. For example, in the case described for FIG. 5, message C1 might actually have been received at the UE 500 before message C2, but the complete message to C1 was delayed when sent via embedded RRC (either on the LTE radio or on the X2 interface between the MeNB 520 and SgNB 510) and arrived at the SgNB 510 later than the complete message to C2, which was sent via direct SRB.

In a fourth embodiment of this disclosure, sequence numbers (SNs) are added to the NR RRC messages sent from the SgNB 610. The sequence number space may be the same for all RRC messages regardless of whether they are being sent via direct SRB or embedded RRC. For example, if NR RRC message "x" was sent via embedded RRC and sequence number "y" was assigned to it, the next NR RRC message to be sent from the SgNB 610 will be assigned a sequence number of "y+1", irrespective of whether this message is to be sent via embedded RRC or direct SRB. The SN is then beneficially used at the UE 600 for race condition detection or optimization, as will be further described in the next section below. The SN can be sent in a new information element (IE) in the RRC header, or the SN can be sent as an expanded part of the transaction ID being used in LTE (which is currently supports only 4 different values).

Figure 11:
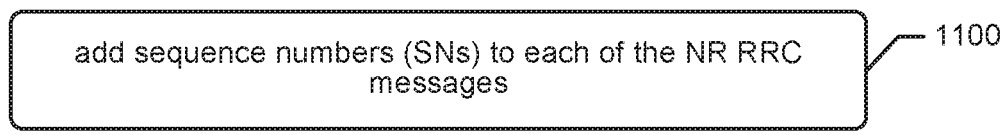

FIG. 11 illustrates related operations and methods according to the fourth embodiment. Referring to FIG. 11, the controlling of the sending of the NR RRC messages in the sequence, includes adding (1100) SNs to each of the NR RRC messages indicating their respective order in the sequence, where the SNs are consecutive numbered irrespective of whether the NR RRC messages are sent through direct SRB communications to the UE or are routed through the master network node for sending by embedded RRC to the UE. The SNs may be added to the NR RRC messages in one of: a new information element in a RRC header of the NR RRC messages; and an expanded part of a transaction identifier contained in the NR RRC messages.

In a fifth embodiment of this disclosure, when there is a persistent race condition detected by the SgNB 610, the SgNB 610 can operate to release the direct SRB and revert to using only embedded RRC. Occurrence of the persistent race condition can be detected by, for example, based on the operations of the third embodiment or based on observing a UE's 600 behavior that indicates that desynchronization has occurred between the configuration (parameters) being used by the UE 600 and the configuration (parameters) that the SgNB 610 assumes the UE 600 is using. The SgNB 610 can release the direct SRB and revert to using only embedded RRC because any configuration/setting can be sent via the embedded RRC while only configurations/settings that do not require coordination between the MeNB 620 and the SgNB 610 can be sent via direct SRB. The SgNB 610 can use different rules to determine when the race condition is persistent, where the rules can include one or more of: 1) determining when a threshold number of race conditions have occurred in a threshold time; 2) determining when a threshold number of consecutive race conditions have occurred, etc.

Figure 12:
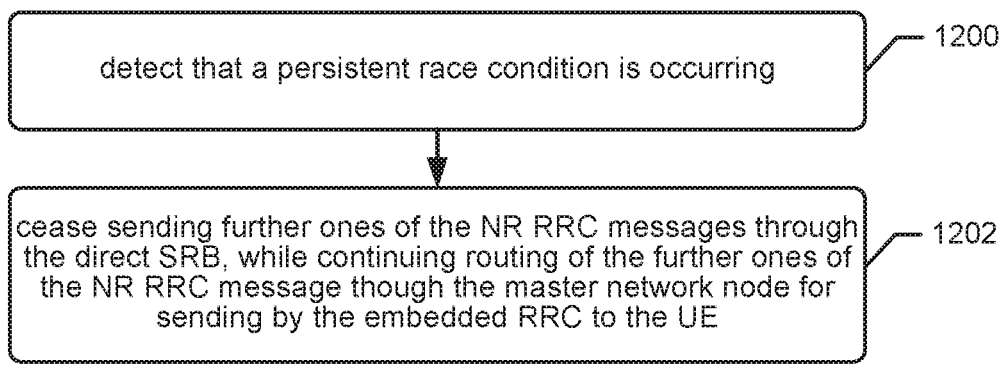

FIG. 12 illustrates related operations and methods according to the fifth embodiment. Referring to FIG. 12, the controlling of the sending of the NR RRC messages in the sequence, includes detecting (1200) that a persistent race condition is occurring whereby some of the NR RRC messages are being received by the UE in an order that does not correspond to the sequence. Responsive to detecting that the persistent race condition is occurring, the operations cease (1202) sending further ones of the NR RRC messages through the direct SRB, while continuing routing of the further ones of the NR RRC message though the master network node for sending by the embedded RRC to the UE.

The persistent race condition may be detected as occurring based on content of RRC complete messages received from the UE indicating that the some of the NR RRC messages are being received by the UE in the order that does not correspond to the sequence. Alternatively or additionally, the persistent race condition may be detected based on observing behavior of the UE that indicates that desynchronization has occurred between the configuration being used by the UE and the configuration that the secondary network node assumes the UE is using. The persistent race condition may be detected as occurring based on one of: determining when a threshold number of race conditions have occurred in a threshold time; and determining when a threshold number of consecutive race conditions have occurred.

UE Operational Mechanisms

Operational mechanisms are disclosed in this section that can be carried out by the UE 600 to recover from a race condition that has already happened.

If there is no direct Signaling Radio Bearer (SRB) that is configured, the operations of the UE 600 when it receives RRC messages remains similar to LTE in the case of embedded RRC. That is, RRC complete messages will be sent containing the transaction ID of the message that triggered this response. For example, if the UE 600 receives an LTE RRC message with a transaction ID "x" that contains an embedded NR RRC message with a transaction ID "y", the UE 600 generates an NR RRC complete message with an indication of the transaction ID of the message that generated it ("y") and embeds the indication in an LTE RRC complete message with an indication of the transaction ID of the message that generated it ("x"). However, a different operational approach may be taken when a direct SRB is also configured.

Figure 13:
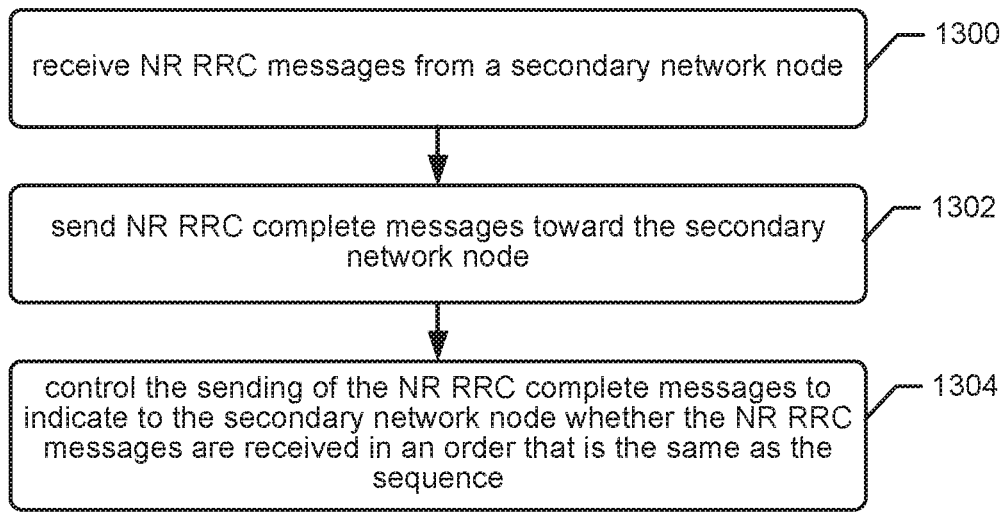
FIGS. 13-17 are flow charts of operations of a UE to recover from a race condition according to some embodiments.

FIG. 13 is a flowchart of operations and methods that may be performed by the UE. Referring to FIG. 13, the UE receives (1300) NR RRC messages from a secondary network node. The NR RRC messages each contain a number, e.g., a sequence number (SN) or transaction ID, that the secondary network node added to the NR RRC messages to indicate their respective order in a sequence which the NR RRC messages were sent by the secondary network node. The NR RRC messages each contains parameters that the UE uses to configure its communications through a NR interface with the secondary network node. Some of the NR RRC messages are received through direct SRB communications from the secondary network node and some other of the NR RRC messages are routed by the secondary network node through a master network node and received by the UE from the master network node using embedded RRC. The UE sends (1302) NR RRC complete messages toward the secondary network node responsive to receipt of the NR RRC messages, where the NR RRC complete messages each contain an indication of the NR RRC message that was received. The UE controls (1304) the sending of the NR RRC complete messages to indicate to the secondary network node whether the NR RRC messages are received in an order that is the same as the sequence.

In a sixth embodiment of this disclosure, the UE 600 only sends the complete messages for NR RRC messages via direct SRB (i.e., not by embedded RRC), which were sent from the SgNB 610 and irrespective of whether they were received via embedded RRC or direct SRB. This operation is performed in conjunction with the operations in the third embodiment performed by the SgNB 610, and ensures that an out of order detection at the SgNB 610 is in fact due to out of order reception at the UE 600, since the same path is used by the UE 600 to send the complete messages to the SgNB 610. Thus, unnecessary retransmissions of RRC messages such as described above may be prevented.

Figure 14:
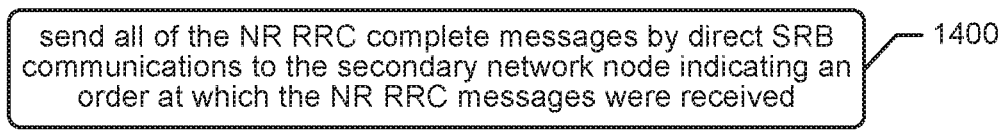

FIG. 14 illustrates related operations and methods according to the sixth embodiment. Referring to FIG. 14, the controlling of the sending of the NR RRC complete messages, includes sending (1400) all of the NR RRC complete messages by direct SRB communications to the secondary network node indicating an order at which the NR RRC messages were received.

In a seventh embodiment of this disclosure, the UE 600 compiles NR RRC messages sent from the SgNB 610 (whether they were received via embedded RRC or direct SRB) only if they were received in order. When an SgNB 610 RRC message is received out of order, then it is saved and compiled only after the missing messages are received and compiled. The out of order determination is done by comparing the SN of RRC messages, which were introduced as per the fourth embodiment, or looking into other information such as the transaction ID.

Figure 15:
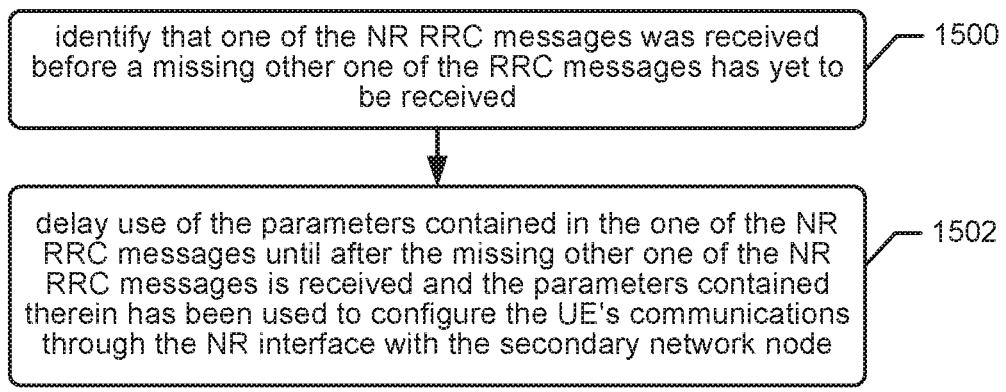

FIG. 15 illustrates related operations and methods according to the seventh embodiment. Referring to FIG. 15, the controlling of the sending of the NR RRC complete messages, includes responding to identifying (1500) based on the numbers, e.g., SNs or transaction IDs, that one of the NR RRC messages was received before a missing other one of the RRC messages has yet to be received, by delaying (1502) use of the parameters contained in the one of the NR RRC messages to configure the UE's communications through a NR interface with the secondary network node until after the missing other one of the NR RRC messages is received and the parameters contained in the missing other one of the NR RRC messages has been used to configure the UE's communications through the NR interface with the secondary network node.

In an eighth embodiment of this disclosure, the UE 600 will compile the NR RRC messages sent from the SgNB 610 (both if received via embedded RRC or direct SRB) in the order that they arrive at the UE 600. However, when the UE 600 detects an out of order reception of NR RRC messages, it will also store the out of order messages/configurations. When the missing message(s) is(are) received, the UE 600 then identifies the conflicting parts, if any, and will reconfigure the UE 600 with the latest values. For example, for the case described for FIG. 5, when the UE 600 gets message C2 out of order, it configures parameters p1 and p2 to p1_2 and p2_2, and keeps the message 2. When C1 is subsequently received, the UE 600 identifies p1 and p2 as conflicting parts of the configurations, since they are included in both messages, and decides to keep the values as p1_2 and p2_2 because these are the settings in the latest messages sent from the SgNB 610 (i.e. message C2). The UE 600 can determine which parts to keep based on the SN or transaction ID. The UE 600 will update the values of p3 and p4 to p3_1 and p4_1 as these were not included in the out of order message received previously.

Figure 16:
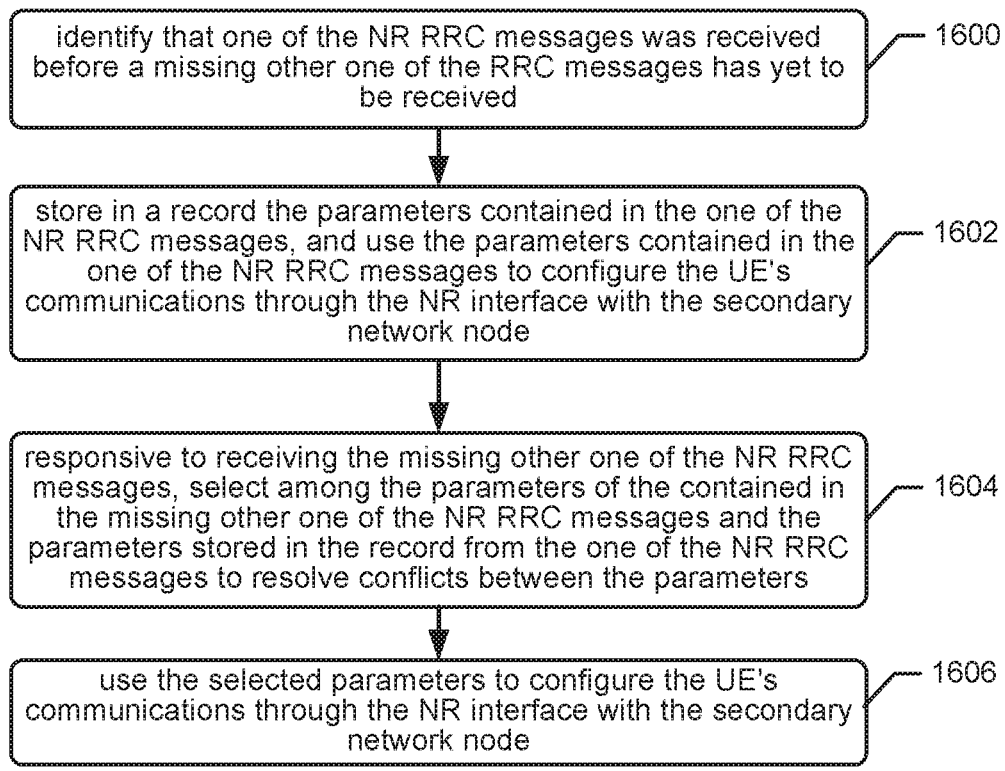

FIG. 16 illustrates related operations and methods according to the eighth embodiment. Referring to FIG. 16, the controlling of the sending of the NR RRC complete messages, includes responding to identifying (1600) based on the number, e.g., a sequence number (SN) or transaction ID, that one of the NR RRC messages was received before a missing other one of the RRC messages has yet to be received, by storing (1602) in a record the parameters contained in the one of the NR RRC messages, and using the parameters contained in the one of the NR RRC messages to configure the UE's communications through the NR interface with the secondary network node. Responsive to the receipt of the missing other one of the NR RRC messages, a selection (1604) is made among the parameters contained in the missing other one of the NR RRC messages and the parameters stored in the record from the one of the NR RRC messages to resolve conflicts between the parameters. The UE then operates using the selected parameters to configure (1606) the UE's communications through the NR interface with the secondary network node.

The selection (1604) among the parameters can be performed using SNs which the secondary network node added to each of the NR RRC messages to indicate their respective order in the sequence, to select the newest parameters among the parameters contained in the missing other one of the NR RRC messages and the parameters stored in the record from the one of the NR RRC messages.

In a ninth embodiment of this disclosure, the UE 600 includes a SN (or transaction ID) in the RRC complete messages that it is sending to the SgNB 610. The SN or transaction ID is included irrespective of whether the message is to be sent via embedded RRC or direct SRB, and the sequence number space is shared among the two (embedded RRC and direct SRB pathways). Similar to the sixth embodiment, this can be used in conjunction with the third embodiment to ensure that the out of order detection at the SN was in fact valid, and thereby will prevent the SN from transmitting RRC messages unnecessarily.

The controlling of the sending of the NR RRC complete messages, can include adding an order of receipt indicator to each of the NR RRC complete messages to indicate the order at which the corresponding one of the NR RRC messages was received. Order of receipt indicators that comprise SNs may be added to each of the NR RRC complete messages to indicate the order with which the corresponding NR RRC messages were received. Alternatively or additionally, transaction IDs may be added to each of the NR RRC complete messages to indicate the order at which the corresponding one of the NR RRC messages was received. The transaction IDs can be obtained from the NR RRC messages corresponding to the NR RRC complete messages.

In a tenth embodiment of this disclosure, if there is a persistent race condition detected by the UE 600, for example on the reception of out of order NR RRC messages as detected via the embedded RRC and direct SRB, the UE 600 informs the SgNB 610 via RRC messaging about the existence of the persistent race condition. The SgNB 610 could then responsively decide to release the direct SRB, similar to embodiment five. Similar to the fifth embodiment, the UE 600 can use different rules to determine when a race condition is persistent, where the rules can include one or more of: 1) determining when a threshold number of race condition have occurred in a threshold time; 2) determining when a threshold number of consecutive race conditions have occurred, etc. The SgNB 610 may configure the threshold number and/or threshold time that are used by the UE 600 for the rules to determine when a race condition is persistent. A simpler approach that may be performed is for the UE to send a report every time the UE 600 detects an out of order reception, and the SgNB 610 can then responsively perform rules to decide if a persistent race condition is occurring.

Figure 17:
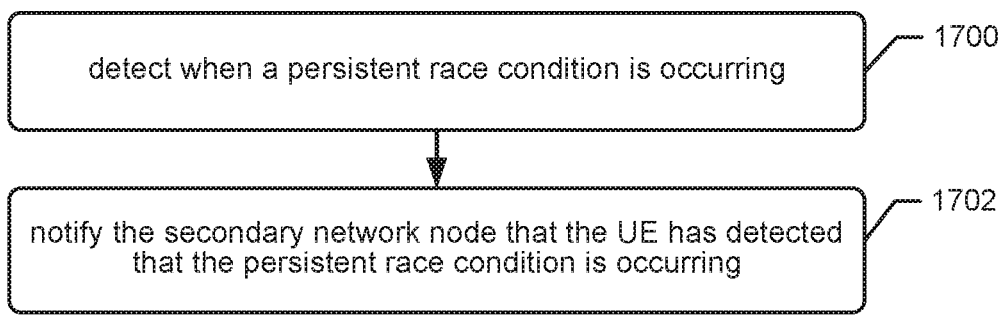

FIG. 17 illustrates related operations and methods according to the tenth embodiment. Referring to FIG. 17, the controlling of the sending of the NR RRC complete messages, includes detecting (1700) when a persistent race condition is occurring whereby some of the NR RRC messages are being received in an order that does not correspond to the sequence, and notifying (1702) the secondary network node that the UE has detected that the persistent race condition is occurring.

The detecting (1700) when a persistent race condition is occurring can include performing the detecting based on content of NR RRC messages indicating that the some of the NR RRC messages are being received by the UE in an order that does not correspond to the sequence. The persistent race condition may be detected based on observing behavior of the secondary network node that indicates that desynchronization has occurred between the configuration being used by the UE and the configuration that the secondary network node assumes the UE is using. The persistent race condition may alternatively or additionally be detected based on one of: determining when a threshold number of race conditions have occurred in a threshold time; and determining when a threshold number of consecutive race conditions have occurred.

Figure 18:
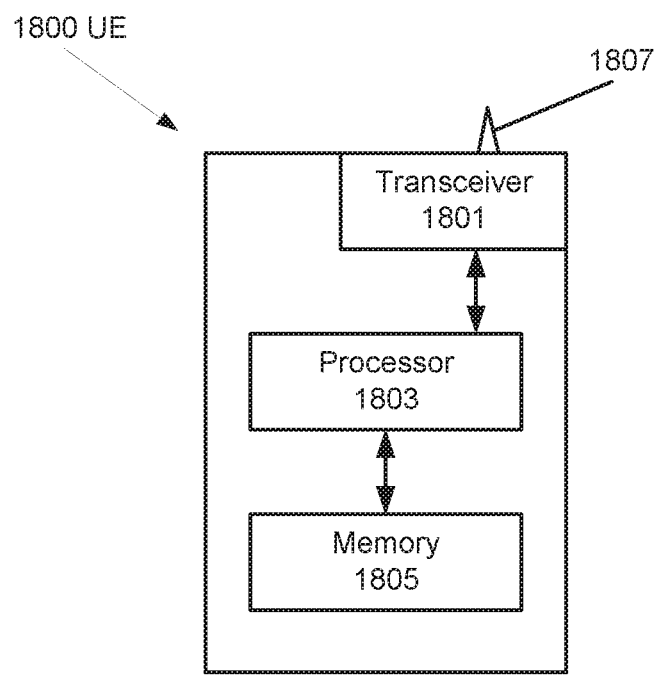
FIG. 18 is a block diagram illustrating elements of a UE configured to operate according to some embodiments.

Example Elements of UE and Network Node:

FIG. 18 is a block diagram illustrating elements of a UE 1800 (also referred to as a wireless terminal, a wireless communication device, a wireless communication terminal, user equipment, a user equipment node/terminal/device, etc.) configured to operate according to one or more embodiments of the present disclosure. The UE 1800 may correspond to the UE 600 in FIG. 6. As shown, the UE 1800 may include at least one antenna 1807, and at least one transceiver circuit 1801 (also referred to as a transceiver) including a transmitter and a receiver configured to provide uplink and downlink radio communications with a base station of a radio access network. The UE 1800 may also include at least one processor circuit 1803 (also referred to as a processor) coupled to the transceiver 1801, and at least one memory circuit 1805 (also referred to as memory) coupled to the processor 1803. The memory 1805 may include computer readable program code that when executed by the processor 1803 causes the processor 1803 to perform operations according to embodiments disclosed herein for a UE. According to other embodiments, processor 1803 may be defined to include memory so that a separate memory circuit is not required. The UE 1800 may also include an interface (such as a user interface) coupled with processor 1803, and/or the UE 1800 may be incorporated in a vehicle.

Figure 19:
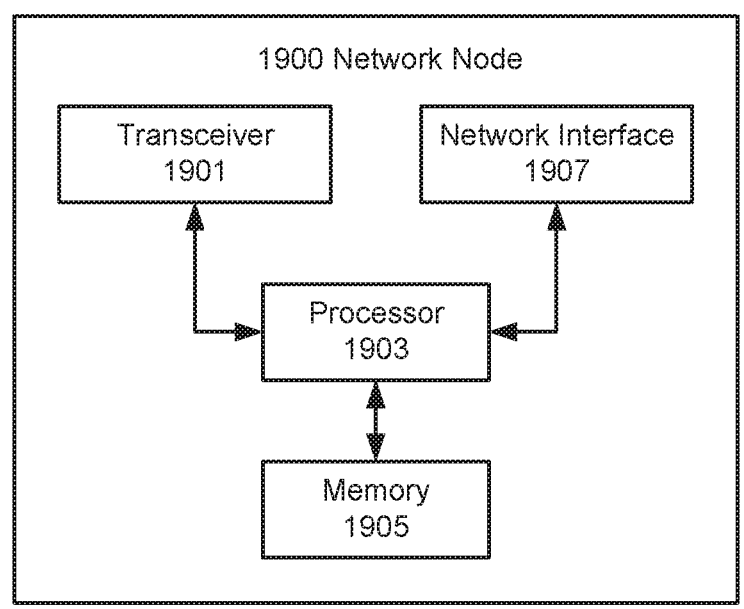
FIG. 19 is a block diagram illustrating elements of a network node configured to provide communication according to some embodiments.

FIG. 19 is a block diagram illustrating elements of a network node 1900 (also referred to as a network node, base station, master network node, MeNB, secondary network node, SgNB, etc.) configured to provide communication according to embodiments of inventive concepts. The network node may correspond to the SgNB 610 or the MeNB 620 shown in FIG. 6. As shown, the network node 1900 may include at least one transceiver circuit 1901 (also referred to as a transceiver) including a transmitter and a receiver configured to provide uplink and downlink radio communications with UEs. The network node 1900 may include at least one network interface circuit 1907 (also referred to as a network interface) configured to provide communications with other nodes (e.g., with other base stations) of the RAN. The network node 1900 may also include at least one processor circuit 1903 (also referred to as a processor) coupled to the transceiver 1901 and/or the network interface 1907, and at least one memory circuit 1905 (also referred to as memory) coupled to the processor 1903. The memory 1905 may include computer readable program code that when executed by the processor 1903 causes the processor 1903 to perform operations according to embodiments disclosed herein for a network node, such as a secondary network node or SgNB. According to other embodiments, processor 1903 may be defined to include memory so that a separate memory circuit is not required.

Figure 20:
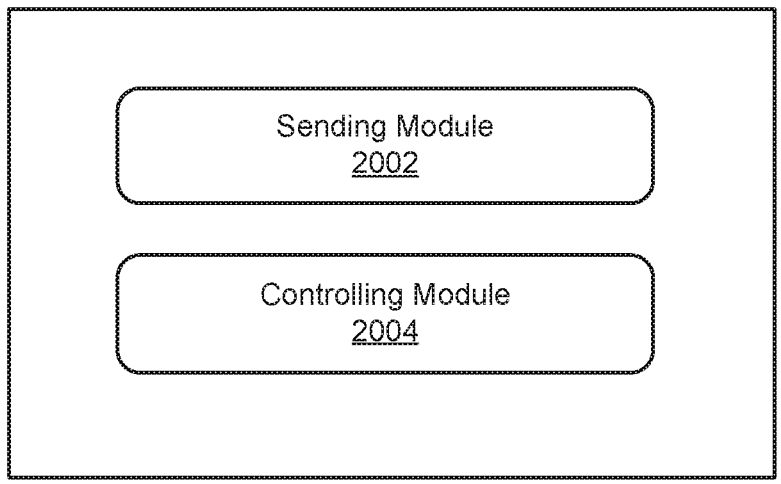
FIG. 20 illustrates modules residing in a network node that perform operations as disclosed herein according to some embodiments.

FIG. 20 illustrates modules residing in a network node, such as the secondary network node or SgNB, that perform operations as disclosed herein according to some embodiments. The network node includes a sending module (2002) and a controlling module (2004). The sending module (2002) is configured for sending a sequence of NR RRC messages toward the UE. The NR RRC messages each contain parameters that configure a UE's communications through a NR interface. Some of the NR RRC messages in the sequence are sent through direct SRB communications to the UE and some other of the NR RRC messages in the sequence are routed through a master network node for sending by embedded RRC to the UE. The controlling module (2004) is configured for controlling the sending of the NR RRC messages in the sequence to avoid the UE receiving the NR RRC messages in an order that is different from the sequence.

Figure 21:
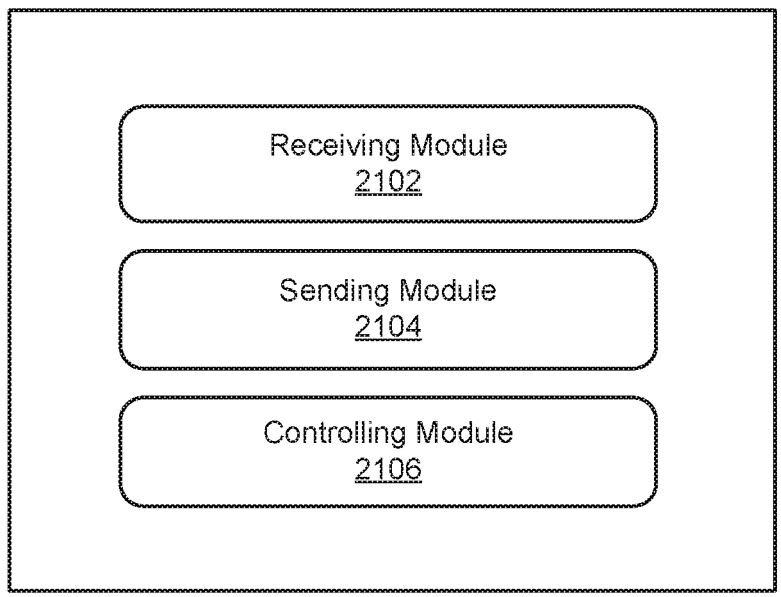
FIG. 21 illustrates modules residing in a UE that perform operations as disclosed herein according to some embodiments

FIG. 21 illustrates modules residing in a UE that perform operations as disclosed herein according to some embodiments. The UE includes a receiving module (2102), a sending module (2104), and a controlling module (2106). The receiving module (2102) is configured for receiving NR RRC messages from a secondary network node. The NR RRC messages each contain a number, e.g., a sequence number (SN) or transaction ID, that the secondary network node added to the NR RRC messages to indicate their respective order in a sequence which the NR RRC messages were sent by the secondary network node. The NR RRC messages each contains parameters that the UE uses to configure its communications through a NR interface with the secondary network node. Some of the NR RRC messages are received through direct SRB communications from the secondary network node and some other of the NR RRC messages are routed by the secondary network node through a master network node and received by the UE from the master network node using embedded RRC. The sending module (2104) is configured for sending NR RRC complete messages toward the secondary network node responsive to receipt of the NR RRC messages, wherein the NR RRC complete messages each contain an indication of the NR RRC message that was received. The controlling module (2106) is configured for controlling the sending of the NR RRC complete messages to indicate to the secondary network node whether the NR RRC messages are received in an order that is the same as the sequence.

Abbreviations and Explanations

AP Application Protocol
CP Control Plane
DC Dual Connectivity
DL Downlink
DRB Data Radio Bearer
eNB Base station
E-RAB EUTRAN Radio Access Bearer
GTP-U GPRS Tunneling Protocol—User Plane
IP Internet Protocol
LTE Long Term Evolution
MCG Master Cell Group
MAC Medium Access Control
MeNB Master eNB
MN Master Node
NG Next Generation
NR New Radio
PDCP Packet Data Convergence Protocol
RAT Radio Access Technology
RLC Radio Link Control
RRC Radio Resource Control
SCG Secondary Cell Group
SCTP Stream Control Transmission Protocol
SeNB Secondary eNB
SgNB Secondary NG Base station
SN Secondary Node
SN Sequence Number
SRB Signaling Radio Bearer
TEID Tunnel Endpoint IDentifier
TNL Transport Network Layer
UDP User Datagram Protocol
UE User Equipment
UL Uplink
UP User Plane Further Definitions and Embodiments In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

LISTING OF EXAMPLE EMBODIMENTS

Embodiment 1

A method of operating a secondary network node to perform control signaling to a user equipment, UE, that operates in a radio access network, RAN, the method comprising:

sending (700) a sequence of new radio, NR, radio resource control, RRC, messages toward the UE, wherein the NR RRC messages each contain parameters that configure a UE's communications through a NR interface, some of the NR RRC messages in the sequence are sent through direct signaling radio bearer, SRB, communications to the UE and some other of the NR RRC messages in the sequence are routed through a master network node for sending by embedded RRC to the UE; and controlling (702) the sending of the NR RRC messages in the sequence to avoid the UE receiving the NR RRC messages in an order that is different from the sequence.

Embodiment 2

The method of Embodiment 1, wherein controlling (702) the sending of the NR RRC messages in the sequence to avoid the UE receiving the NR RRC messages in an order that is different from the sequence, comprises:

waiting (800) for receipt of a complete message from the UE confirming receipt of one of the NR RRC message before initiating the sending a next NR RRC message in the sequence toward the UE.

Embodiment 3

The method of any of Embodiments 1 to 2, wherein controlling (702) the sending of the NR RRC messages in the sequence to avoid the UE receiving the NR RRC messages in an order that is different from the sequence, comprises:

obtaining (900) a set of the parameters that are ready to be sent to the UE;

identifying (902) a first subset of the parameters that are to be sent to the UE and which are to be coordinated with the master network node;

identifying (904) a second subset of the parameters that are to be sent to the UE and which are not to be coordinated with the master network node;

routing (906) a NR RRC message containing the first subset of the set of the parameters through the master network node for coordination and then sending by embedded RRC to the UE;

sending (908) another NR RRC message containing the second subset of the parameters through SRB communications to the UE.

Embodiment 4

The method of any of Embodiments 1 to 3, wherein controlling (702) the sending of the NR RRC messages in the sequence to avoid the UE receiving the NR RRC messages in an order that is different from the sequence, comprises:

maintaining (1000) a record of the parameters that are contained in each of the NR RRC messages that are sent in the sequence;

determining (1002) that a RRC complete message received from the UE indicates that one of the NR RRC messages was received by the UE in an order that corresponds to the sequence; and responsive to the determining, removing (1004) from the record the parameters that are contained in the one of NR RRC message.

Embodiment 5

The method of Embodiment 4, wherein controlling (702) the sending of the NR RRC messages in the sequence to avoid the UE receiving the NR RRC messages in an order that is different from the sequence, further comprises:

further determining that another RRC complete message received from the UE indicates that another one of the NR RRC messages was received by the UE in an order that does not correspond to the sequence; and responsive to the further determining, retrieving from the record the parameters contained in the another one of the NR RRC messages and sending a further NR RRC message containing the retrieved parameters toward the UE.

Embodiment 6

The method of Embodiment 4, wherein controlling (702) the sending of the NR RRC messages in the sequence to avoid the UE receiving the NR RRC messages in an order that is different from the sequence, further comprises:

further determining that another RRC complete message received from the UE indicates that another one of the NR RRC messages was received by the UE in an order that does not correspond to the sequence; and responsive to the further determining, identifying from the record which parameters the UE is presently using to configure communications through the NR interface, and using the identified parameters for communications with the UE through the NR interface.

Embodiment 7

The method of any of Embodiments 1 to 6, wherein controlling (702) the sending of the NR RRC messages in the sequence to avoid the UE receiving the NR RRC messages in an order that is different from the sequence, comprises:

adding (1100) sequence numbers, SNs, to each of the NR RRC messages indicating their respective order in the sequence, wherein the SNs are consecutive numbered irrespective of whether the NR RRC messages are sent through direct SRB communications to the UE or are routed through the master network node for sending by embedded RRC to the UE.

Embodiment 8

The method of Embodiment 7, wherein the SNs are added to the NR RRC messages in one of: a new information element in a RRC header of the NR RRC messages; and an expanded part of a transaction identifier contained in the NR RRC messages.

Embodiment 9

The method of any of Embodiments 1 to 8, wherein controlling (702) the sending of the NR RRC messages in the sequence to avoid the UE receiving the NR RRC messages in an order that is different from the sequence, comprises:

detecting (1200) that a persistent race condition is occurring whereby some of the NR RRC messages are being received by the UE in an order that does not correspond to the sequence; and responsive to detecting that the persistent race condition is occurring, ceasing (1202) sending further ones of the NR RRC messages through the direct SRB, while continuing routing of the further ones of the NR RRC message though the master network node for sending by the embedded RRC to the UE.

Embodiment 10

The method of Embodiment 9, wherein detecting (1200) that the persistent race condition is occurring whereby some of the NR RRC messages are being received by the UE in the order that does not correspond to the sequence, comprises:

performing the detecting based on content of RRC complete messages received from the UE indicating that the some of the NR RRC messages are being received by the UE in the order that does not correspond to the sequence.

Embodiment 11

The method of Embodiment 9, wherein detecting (1200) that the persistent race condition is occurring whereby some of the NR RRC messages are being received by the UE in the order that does not correspond to the sequence, comprises:

performing the detecting based on observing behavior of the UE that indicates that desynchronization has occurred between the configuration being used by the UE and the configuration that the secondary network node assumes the UE is using.

Embodiment 12

The method of any of Embodiments 9 to 11, wherein detecting (1200) that the persistent race condition is occurring whereby some of the NR RRC messages are being received by the UE in the order that does not correspond to the sequence, comprises:

detecting that the persistent race condition is occurring based on one of: determining when a threshold number of race conditions have occurred in a threshold time; and determining when a threshold number of consecutive race conditions have occurred.

Embodiment 13

The method of any of Embodiments 1 to 12, wherein the secondary network node is a secondary next generation base station, SgNB, and the master network node is a master base station, eNB.

Embodiment 14

A computer program product comprising a non-transitory computer readable medium storing program code that when executed by a processor of the secondary network node causes the secondary network node to perform operations of the method of any of Embodiments 1 to 13.

Embodiment 15

A secondary network node adapted to perform the method of any of Embodiments 1 to 13.

Embodiment 16

A secondary network node (1900) comprising:
at least one network interface (1901, 1907);
at least one processor (1903) coupled to the at least one network interface (1901, 1907); and
at least one memory (1905) coupled to the at least one processor (1903) and storing program code that when executed by the at least one processor (1903) causes the at least one processor (1903) to perform operations comprising:
sending a sequence of new radio, NR, radio resource control, RRC, messages toward the UE, wherein the NR RRC messages each contain parameters that configure a UE's communications through a NR interface, some of the NR RRC messages in the sequence are sent through direct signaling radio bearer, SRB, communications to the UE and some other of the NR RRC messages in the sequence are routed through a master network node for sending by embedded RRC to the UE; and
controlling the sending of the NR RRC messages in the sequence to avoid the UE receiving the NR RRC messages in an order that is different from the sequence.

Embodiment 17

The secondary network node (1900) of Embodiment 16, wherein the at least one processor (1903) further executes the program code to perform the method of any of Embodiments 2 to 13.

Embodiment 18

A secondary network node comprising:
a sending module (2002) for sending a sequence of new radio, NR, radio resource control, RRC, messages toward the UE, wherein the NR RRC messages each contain parameters that configure a UE's communications through a NR interface, some of the NR RRC messages in the sequence are sent through direct signaling radio bearer, SRB, communications to the UE and some other of the NR RRC messages in the sequence are routed through a master network node for sending by embedded RRC to the UE;
a controlling module (2004) for controlling the sending of the NR RRC messages in the sequence to avoid the UE receiving the NR RRC messages in an order that is different from the sequence.

Embodiment 19

The secondary network node of Embodiment 18, wherein any one or more of the modules performs the method of any of Embodiments 2 to 13.

Embodiment 20

A method of operating a user equipment, UE, that operates in a radio access network, RAN, the method comprising:

receiving (1300) new radio, NR, radio resource control, RRC, messages from a secondary network node, wherein the NR RRC messages each contains a number that the secondary network node added to the NR RRC messages to indicate their respective order in a sequence which the NR RRC messages were sent by the secondary network node, and the NR RRC messages each contain parameters that the UE uses to configure its communications through a NR interface with the secondary network node, some of the NR RRC messages are received through direct signaling radio bearer, SRB, communications from the secondary network node and some other of the NR RRC messages are routed by the secondary network node through a master network node and received by the UE from the master network node using embedded RRC;

sending (1302) NR RRC complete messages toward the secondary network node responsive to receipt of the NR RRC messages, wherein the NR RRC complete messages each contain an indication of the NR RRC message that was received; and controlling (1304) the sending of the NR RRC complete messages to indicate to the secondary network node whether the NR RRC messages are received in an order that is the same as the sequence.

Embodiment 21

The method of Embodiment 20, wherein controlling (1304) the sending of the NR RRC complete messages to indicate to the secondary network node whether the NR RRC messages are received in an order that is different from the sequence, comprises:

sending (1400) all of the NR RRC complete messages by direct SRB communications to the secondary network node indicating an order at which the NR RRC messages were received.

Embodiment 22

The method of any of Embodiments 20 to 21, further comprising: responsive to identifying (1500) based on the numbers that one of the NR RRC messages was received before a missing other one of the RRC messages has yet to be received, delaying (1502) use of the parameters contained in the one of the NR RRC messages to configure the UE's communications through a NR interface with the secondary network node until after the missing other one of the NR RRC messages is received and the parameters contained in the missing other one of the NR RRC messages has been used to configure the UE's communications through the NR interface with the secondary network node.

Embodiment 23

The method of any of Embodiments 20 to 22, further comprising: responsive to identifying (1600) based on the numbers that one of the NR RRC messages was received before a missing other one of the RRC messages has yet to be received, storing (1602) in a record the parameters contained in the one of the NR RRC messages, and using the parameters contained in the one of the NR RRC messages to configure the UE's communications through the NR interface with the secondary network node;

responsive to the receipt of the missing other one of the NR RRC messages, selecting (1604) among the parameters contained in the missing other one of the NR RRC messages and the parameters stored in the record from the one of the NR RRC messages to resolve conflicts between the parameters; and using the selected parameters to configure (1606) the UE's communications through the NR interface with the secondary network node.

Embodiment 24

The method of Embodiment 23, wherein selecting (1604) among the parameters contained in the missing other one of the NR RRC messages and the parameters stored in the record from the one of the NR RRC messages to resolve conflicts between the parameters, comprises:

using sequence numbers, SNs, which the secondary network node added as the numbers to each of the NR RRC messages to indicate their respective order in the sequence, to select the newest parameters among the parameters contained in the missing other one of the NR RRC messages and the parameters stored in the record from the one of the NR RRC messages.

Embodiment 25

The method of any of Embodiments 20 to 24, wherein controlling (1304) the sending of the NR RRC complete messages to indicate to the secondary network node whether the NR RRC messages are received in an order that is different from the sequence, comprises:

adding an order of receipt indicator to each of the NR RRC complete messages to indicate the order at which the corresponding one of the NR RRC messages was received.

Embodiment 26

The method of Embodiment 25, wherein adding the order of receipt indicators comprise adding sequence numbers, SNs, to the NR RRC complete messages to indicate the order with which the corresponding NR RRC messages were received.

Embodiment 27

The method of Embodiment 25, wherein adding the order of receipt indicators comprise adding transaction IDs to the NR RRC complete messages, the transaction IDs being obtained from the NR RRC messages corresponding to the NR RRC complete messages.

Embodiment 28

The method of any of Embodiments 20 to 27, wherein controlling (1304) the sending of the NR RRC complete messages to indicate to the secondary network node whether the NR RRC messages are received in an order that is different from the sequence, comprises:

detecting (1700) when a persistent race condition is occurring whereby some of the NR RRC messages are being received in an order that does not correspond to the sequence; and notifying (1702) the secondary network node that the UE has detected that the persistent race condition is occurring.

Embodiment 29

The method of Embodiment 28, wherein detecting (1700) when a persistent race condition is occurring whereby some of the NR RRC messages are being received in an order that does not correspond to the sequence, comprises:

performing the detecting based on content of NR RRC messages indicating that the some of the NR RRC messages are being received by the UE in an order that does not correspond to the sequence.

Embodiment 30

The method of Embodiment 28, wherein detecting (1700) when a persistent race condition is occurring whereby some of the NR RRC messages are being received in an order that does not correspond to the sequence, comprises:

performing the detecting based on observing behavior of the secondary network node that indicates that desynchronization has occurred between the configuration being used by the UE and the configuration that the secondary network node assumes the UE is using.

Embodiment 31

The method of Embodiment 28, wherein detecting (1700) when a persistent race condition is occurring whereby some of the NR RRC messages are being received in an order that does not correspond to the sequence, comprises:

detecting that the persistent race condition is occurring based on one of: determining when a threshold number of race conditions have occurred in a threshold time; and determining when a threshold number of consecutive race conditions have occurred.

Embodiment 32

A computer program product comprising a non-transitory computer readable medium storing program code that when executed by a processor of the UE causes the UE to perform operations of the method of any of Embodiments 20 to 31.

Embodiment 33

A UE adapted to perform the method of any of Embodiments 20 to 31.

Embodiment 34

A user equipment, UE, (1800) that operates in a radio access network, RAN, the UE (1800) comprising:

at least one transceiver (1801);
at least one processor (1803) coupled to the at least one transceiver (1801); and
at least one memory (1805) coupled to the at least one processor (1803) and storing program code that when executed by the at least one processor (1803) causes the at least one processor (1803) to perform operations comprising:

receiving new radio, NR, radio resource control, RRC, messages from a secondary network node, wherein the NR RRC messages each contains a number that the secondary network node added to the NR RRC messages to indicate their respective order in a sequence which the NR RRC messages were sent by the secondary network node, and the NR RRC messages each contain parameters that the UE uses to configure its communications through a NR interface with the secondary network node, some of the NR RRC messages are received through direct signaling radio bearer, SRB, communications from the secondary network node and some other of the NR RRC messages are routed by the secondary network node through a master network node and received by the UE from the master network node using embedded RRC;

sending NR RRC complete messages toward the secondary network node responsive to receipt of the NR RRC messages, wherein the NR RRC complete messages each contain an indication of the NR RRC message that was received; and controlling the sending of the NR RRC complete messages to indicate to the secondary network node whether the NR RRC messages are received in an order that is the same as the sequence.

Embodiment 35

The network node of Embodiment 34, wherein the at least one processor (1803) further executes the program code to perform the method of any of Embodiments 21 to 31.

Embodiment 36

A user equipment, UE, that operates in a radio access network, RAN, the UE comprising:

a receiving module (2102) for receiving new radio, NR, radio resource control, RRC, messages from a secondary network node, wherein the NR RRC messages each contains a number that the secondary network node added to the NR RRC messages to indicate their respective order in a sequence which the NR RRC messages were sent by the secondary network node, and the NR RRC messages each contain parameters that the UE uses to configure its communications through a NR interface with the secondary network node, some of the NR RRC messages are received through direct signaling radio bearer, SRB, communications from the secondary network node and some other of the NR RRC messages are routed by the secondary network node through a master network node and received by the UE from the master network node using embedded RRC;

a sending module (2104) for sending NR RRC complete messages toward the secondary network node responsive to receipt of the NR RRC messages, wherein the NR RRC complete messages each contain an indication of the NR RRC message that was received; and a controlling module (2106) for controlling the sending of the NR RRC complete messages to indicate to the secondary network node whether the NR RRC messages are received in an order that is the same as the sequence.

Embodiment 37

The UE of Embodiment 27, wherein any one or more of the modules performs the method of any of Embodiments 21 to 31.

The invention claimed is:

1. A method of operating a user equipment, UE, that operates in a radio access network, RAN, the method comprising:

receiving new radio, NR, radio resource control, RRC, messages from a secondary network node, wherein the NR RRC messages each contains a number that the secondary network node added to the NR RRC messages to indicate their respective order in a sequence which the NR RRC messages were sent by the secondary network node, and the NR RRC messages each contain parameters that the UE uses to configure its communications through a NR interface with the secondary network node, some of the NR RRC messages are received through direct signaling radio bearer, SRB, communications from the secondary network node and some other of the NR RRC messages are routed by the secondary network node through a master network node and received by the UE from the master network node using embedded RRC;

sending NR RRC complete messages toward the secondary network node responsive to receipt of the NR RRC messages, wherein the NR RRC complete messages each contain an indication of the NR RRC message that was received; and controlling the sending of the NR RRC complete messages to indicate to the secondary network node whether the NR RRC messages are received in an order that is the same as the sequence, wherein the controlling comprises sending all of the NR RRC complete messages by direct SRB communications to the secondary network node indicating an order at which the NR RRC messages were received.

2. The method of claim 1, further comprising:

responsive to identifying based on the numbers that one of the NR RRC messages was received before a missing other one of the RRC messages has yet to be received, delaying use of the parameters contained in the one of the NR RRC messages to configure the UE's communications through a NR interface with the secondary network node until after the missing other one of the NR RRC messages is received and the parameters contained in the missing other one of the NR RRC messages has been used to configure the UE's communications through the NR interface with the secondary network node.

3. The method of claim 1, further comprising:

responsive to identifying based on the numbers that one of the NR RRC messages was received before a missing other one of the RRC messages has yet to be received, storing in a record the parameters contained in the one of the NR RRC messages, and using the parameters contained in the one of the NR RRC messages to configure the UE's communications through the NR interface with the secondary network node;

responsive to the receipt of the missing other one of the NR RRC messages, selecting among the parameters contained in the missing other one of the NR RRC messages and the parameters stored in the record from the one of the NR RRC messages to resolve conflicts between the parameters; and using the selected parameters to configure the UE's communications through the NR interface with the secondary network node.

4. The method of claim 3, wherein selecting among the parameters contained in the missing other one of the NR RRC messages and the parameters stored in the record from the one of the NR RRC messages to resolve conflicts between the parameters, comprises:

using sequence numbers, SNs, which the secondary network node added as the numbers to each of the NR RRC messages to indicate their respective order in the sequence, to select the newest parameters among the parameters contained in the missing other one of the NR RRC messages and the parameters stored in the record from the one of the NR RRC messages.

5. The method of claim 1, wherein controlling the sending of the NR RRC complete messages to indicate to the secondary network node whether the NR RRC messages are received in an order that is different from the sequence, comprises:

adding an order of receipt indicator to each of the NR RRC complete messages to indicate the order at which the corresponding one of the NR RRC messages was received.

6. A computer program product comprising a non-transitory computer readable medium storing program code that when executed by a processor of the secondary network node causes the secondary network node to perform operations of the method of claim 1.

7. A method of operating a secondary network node to perform control signaling to a user equipment, UE, that operates in a radio access network, RAN, the method comprising:

sending a sequence of new radio, NR, radio resource control, RRC, messages toward the UE, wherein the NR RRC messages each contain parameters that configure a UE's communications through a NR interface, some of the NR RRC messages in the sequence are sent through direct signaling radio bearer, SRB, communications to the UE and some other of the NR RRC messages in the sequence are routed through a master network node for sending by embedded RRC to the UE; and controlling the sending of the NR RRC messages in the sequence to avoid the UE receiving the NR RRC messages in an order that is different from the sequence, wherein controlling the sending of the NR RRC messages in the sequence to avoid the UE receiving the NR RRC messages in an order that is different from the sequence, comprises:

maintaining a record of the parameters that are contained in each of the NR RRC messages that are sent in the sequence;

determining that a RRC complete message received from the UE indicates that one of the NR RRC messages was received by the UE in an order that corresponds to the sequence; and responsive to the determining, removing from the record the parameters that are contained in the one of the NR RRC messages.

8. The method of claim 7, wherein controlling the sending of the NR RRC messages in the sequence to avoid the UE receiving the NR RRC messages in an order that is different from the sequence, comprises:

waiting for receipt of a complete message from the UE confirming receipt of one of the NR RRC messages before initiating the sending a next NR RRC message in the sequence toward the UE.

9. The method of claim 7, wherein controlling the sending of the NR RRC messages in the sequence to avoid the UE receiving the NR RRC messages in an order that is different from the sequence, comprises:

obtaining a set of the parameters that are ready to be sent to the UE;

identifying a first subset of the parameters that are to be sent to the UE and which are to be coordinated with the master network node;

identifying a second subset of the parameters that are to be sent to the UE and which are not to be coordinated with the master network node;

routing a NR RRC message containing the first subset of the set of the parameters through the master network node for coordination and then sending by embedded RRC to the UE; and sending another NR RRC message containing the second subset of the parameters through SRB communications to the UE.

10. The method of claim 7, wherein controlling the sending of the NR RRC messages in the sequence to avoid the UE receiving the NR RRC messages in an order that is different from the sequence, further comprises:
further determining that another RRC complete message received from the UE indicates that another one of the NR RRC messages was received by the UE in an order that does not correspond to the sequence; and
responsive to the further determining, retrieving from the record the parameters contained in the another one of the NR RRC messages and sending a further NR RRC message containing the retrieved parameters toward the UE.

11. The method of claim 7, wherein controlling the sending of the NR RRC messages in the sequence to avoid the UE receiving the NR RRC messages in an order that is different from the sequence, comprises:
adding sequence numbers, SNs, to each of the NR RRC messages indicating their respective order in the sequence, wherein the SNs are consecutive numbered irrespective of whether the NR RRC messages are sent through direct SRB communications to the UE or are routed through the master network node for sending by embedded RRC to the UE.

12. A user equipment, UE, that operates in a radio access network, RAN, the UE comprising:
at least one transceiver;
at least one processor coupled to the at least one transceiver; and
at least one memory coupled to the at least one processor and storing program code that when executed by the at least one processor causes the at least one processor to perform operations comprising:
receiving new radio, NR, radio resource control, RRC, messages from a secondary network node, wherein the NR RRC messages each contains a number that the secondary network node added to the NR RRC messages to indicate their respective order in a sequence which the NR RRC messages were sent by the secondary network node, and the NR RRC messages each contain parameters that the UE uses to configure its communications through a NR interface with the secondary network node, some of the NR RRC messages are received through direct signaling radio bearer, SRB, communications from the secondary network node and some other of the NR RRC messages are routed by the secondary network node through a master network node and received by the UE from the master network node using embedded RRC;
sending NR RRC complete messages toward the secondary network node responsive to receipt of the NR RRC messages, wherein the NR RRC complete messages each contain an indication of the NR RRC message that was received; and
controlling the sending of the NR RRC complete messages to indicate to the secondary network node whether the NR RRC messages are received in an order that is the same as the sequence, wherein the controlling comprises sending all of the NR RRC complete messages by direct SRB communications to the secondary network node indicating an order at which the NR RRC messages were received.

13. The UE of claim 12, wherein the at least one processor further executes the program code to perform operations comprising:
responsive to identifying based on the numbers that one of the NR RRC messages was received before a missing other one of the RRC messages has yet to be received, delaying use of the parameters contained in the one of the NR RRC messages to configure the UE's communications through a NR interface with the secondary network node until after the missing other one of the NR RRC messages is received and the parameters contained in the missing other one of the NR RRC messages has been used to configure the UE's communications through the NR interface with the secondary network node.

14. The UE of claim 12, wherein the at least one processor further executes the program code to perform operations comprising:
responsive to identifying based on the numbers that one of the NR RRC messages was received before a missing other one of the RRC messages has yet to be received, storing in a record the parameters contained in the one of the NR RRC messages, and using the parameters contained in the one of the NR RRC messages to configure the UE's communications through the NR interface with the secondary network node;
responsive to the receipt of the missing other one of the NR RRC messages, selecting among the parameters contained in the missing other one of the NR RRC messages and the parameters stored in the record from the one of the NR RRC messages to resolve conflicts between the parameters; and
using the selected parameters to configure the UE's communications through the NR interface with the secondary network node.

15. The UE of claim 14, wherein to select among the parameters contained in the missing other one of the NR RRC messages and the parameters stored in the record from the one of the NR RRC messages to resolve conflicts between the parameters, the at least one processor further executes the program code to perform operations comprising:
using sequence numbers, SNs, which the secondary network node added as the numbers to each of the NR RRC messages to indicate their respective order in the sequence, to select the newest parameters among the parameters contained in the missing other one of the NR RRC messages and the parameters stored in the record from the one of the NR RRC messages.

16. The UE of claim 12, wherein to control the sending of the NR RRC complete messages to indicate to the secondary network node whether the NR RRC messages are received in an order that is different from the sequence, the at least one processor further executes the program code to perform operations comprising:
adding an order of receipt indicator to each of the NR RRC complete messages to indicate the order at which the corresponding one of the NR RRC messages was received.

17. A secondary network node comprising:
at least one network interface;
at least one processor coupled to the at least one network interface; and
at least one memory coupled to the at least one processor and storing program code that when executed by the at least one processor causes the at least one processor to perform operations comprising:

sending a sequence of new radio, NR, radio resource control, RRC, messages toward the UE, wherein the NR RRC messages each contain parameters that configure a UE's communications through a NR interface, some of the NR RRC messages in the sequence are sent through direct signaling radio bearer, SRB, communications to the UE and some other of the NR RRC messages in the sequence are routed through a master network node for sending by embedded RRC to the UE; and controlling the sending of the NR RRC messages in the sequence to avoid the UE receiving the NR RRC messages in an order that is different from the sequence, wherein to control the sending of the NR RRC messages in the sequence to avoid the UE receiving the NR RRC messages in an order that is different from the sequence, the at least one processor further executes the program code to perform operations comprising:

maintaining a record of the parameters that are contained in each of the NR RRC messages that are sent in the sequence;

determining that a RRC complete message received from the UE indicates that one of the NR RRC messages was received by the UE in an order that corresponds to the sequence; and responsive to the determining, removing from the record the parameters that are contained in the one of NR RRC messages.

18. The secondary network node of claim 17, wherein to control the sending of the NR RRC messages in the sequence to avoid the UE receiving the NR RRC messages in an order that is different from the sequence, the at least one processor further executes the program code to perform operations comprising:

waiting for receipt of a complete message from the UE confirming receipt of one of the NR RRC messages before initiating the sending a next NR RRC message in the sequence toward the UE.

19. The secondary network node of claim 17, wherein to control the sending of the NR RRC messages in the sequence to avoid the UE receiving the NR RRC messages in an order that is different from the sequence, the at least one processor further executes the program code to perform operations comprising:

obtaining a set of the parameters that are ready to be sent to the UE;

identifying a first subset of the parameters that are to be sent to the UE and which are to be coordinated with the master network node;

identifying a second subset of the parameters that are to be sent to the UE and which are not to be coordinated with the master network node;

routing a NR RRC message containing the first subset of the set of the parameters through the master network node for coordination and then sending by embedded RRC to the UE;

sending another NR RRC message containing the second subset of the parameters through SRB communications to the UE.

20. The secondary network node of claim 17, wherein to control the sending of the NR RRC messages in the sequence to avoid the UE receiving the NR RRC messages in an order that is different from the sequence, the at least one processor further executes the program code to perform operations comprising:

further determining that another RRC complete message received from the UE indicates that another one of the NR RRC messages was received by the UE in an order that does not correspond to the sequence; and responsive to the further determining, retrieving from the record the parameters contained in the another one of the NR RRC messages and sending a further NR RRC message containing the retrieved parameters toward the UE.

21. The secondary network node of claim 17, wherein to control the sending of the NR RRC messages in the sequence to avoid the UE receiving the NR RRC messages in an order that is different from the sequence, comprises:

adding sequence numbers, SNs, to each of the NR RRC messages indicating their respective order in the sequence, wherein the SNs are consecutive numbered irrespective of whether the NR RRC messages are sent through direct SRB communications to the UE or are routed through the master network node for sending by embedded RRC to the UE.

* * * * *